United States Patent [19]

Greenspan et al.

[11] Patent Number: 4,928,368
[45] Date of Patent: May 29, 1990

[54] METHOD OF DIFFUSION BONDING COPPER AND TITANIUM ALLOYS TO PRODUCE A PROJECTILE

[75] Inventors: Jacob Greenspan, Newton, Mass.; Gasper J. Sacco, Succasunna, N.J.

[73] Assignee: The United States of America as represented by the Secretary of the Army, Washington, D.C.

[21] Appl. No.: 320,242

[22] Filed: Mar. 7, 1989

[51] Int. Cl.⁵ .............................................. B21K 21/06
[52] U.S. Cl. .......................................... 29/1.22; 29/1.3; 29/DIG. 45
[58] Field of Search ............ 29/1.2, 1.22, 1.3, DIG. 4, 29/DIG. 45; 228/193

[56] References Cited

U.S. PATENT DOCUMENTS

| 2,440,952 | 5/1948 | Hurley | 29/1.2 X |
| 3,838,497 | 11/1972 | Rizzitano et al. | 29/493 |
| 4,797,985 | 1/1989 | Prochnow et al. | 29/1.22 X |

*Primary Examiner*—Timothy V. Eley
*Attorney, Agent, or Firm*—Richard J. Donahue

[57] ABSTRACT

A method of diffusion bonding copper to titanium alloy employing hot isostatic pressure by an inert gas in a sealed chamber. Use of niobium metal as an interfoil between the copper and titanium alloy and the application of the method to the manufacture of a projectile is also disclosed.

6 Claims, 1 Drawing Sheet

METHOD OF DIFFUSION BONDING COPPER AND TITANIUM ALLOYS TO PRODUCE A PROJECTILE

The invention described herein may be manufactured used and licensed by or for the Government for Governmental purposes without the payment to us of any royalty thereon.

BACKGROUND OF THE INVENTION

1. Field of the Invention

The invention relates to methods of bonding metals and more particularly to diffusion bonding of copper and titanium alloy and a projectile manufactured thereby.

2. Description of the Prior Art

The use of titanium alloy for artillery projectiles is desirable due to its high strength and substantially lighter weight compared to conventional materials.

In order, for ballistic purposes, to produce a spin on such a projectile as it emerges from a cannon barrel the concept of channeling spiral grooves in the barrel (known as rifling) is employed in conjunction with a soft metal band, for example, a copper band attached to the outer circumference of the projectile. The band deforms into the rifling in the barrel of the cannon and provides a tooth and track combination by which rotation is imparted to the projectile as it travels down the barrel. It is thus known as a rotating band.

For particular applications, swaging, the most common method of attaching such a band is not possible due to the need for a shallow band seat necessitated by structural considerations.

The invention has therefore been devised as a means of attaching such a band to such a projectile in particular and as a means for joining copper and titanium alloy in general. The inventors know of no prior art which anticipates the novel process or product disclosed herein.

SUMMARY OF THE INVENTION

The invention may be summarized as a method for joining copper and titanium alloy by diffusion bonding which method results in a bond of great mechanical integrity. The method employs the use of hot isostatic pressure applied by an inert gas in an autoclave chamber in which the workpieces are placed.

In carrying out the method, a mating surface for both workpieces is prepared and an additional plate of titanium is welded over the titanium alloy workpiece and the copper in a manner to form a hermetically sealed space which is then evacuated. The copper and titanium alloy joint is thereby subjected to intense pressure when placed in the chamber which in combination with the high temperature also generated in the chamber results in the development of certain alloy products at the joint.

Thus by the formation of such products through interdiffusion of the various atoms at the surface boundary, an integral structure is formed which will withstand the shock and stress of a magnitude induced, for example, in the explosive launching of a projectile.

It has also been found that a diffusion bond of even greater strength is obtained by the addition of an interfoil of niobium metal between the copper and titanium alloy such that the boundary alloy products are limited to those of Cu-Nb and Nb-Ti types.

The above method is particularly applicable to the attachment of a rotating band to the outer circumference of a titanium alloy projectile at its base.

The process will therefore be directed in the following description of the preferred embodiment and drawings to the manufacture of a projectile and further such description will additionally include test results attesting to the high mechanical integrity of the bond so achieved.

DESCRIPTION OF THE PREFERRED EMBODIMENT

In accordance with the general process of the invention, a projectile suitable for firing from, for example, a 155 mm field artillery cannon may be manufactured by forming and conditioning the body, attachment of the rotating band by diffusion bonding, and heat treating to attain the final mechanical properties required for such purpose.

Figure 1:
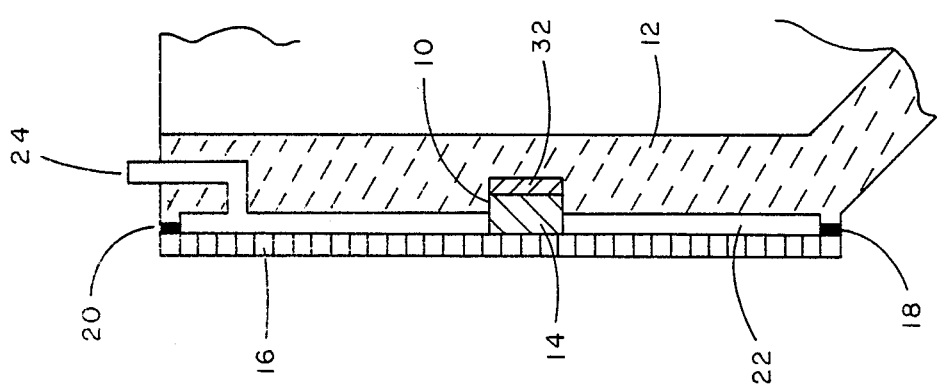
FIG. 1 is a cross-sectional schematic drawing of a portion of a projectile manufactured by the process of the preferred embodiment.

Initially, a quantity of titanium alloy Ti-6Al-6-2Sn alloy, is hot forged at 1600–1650 degrees fahrenheit to a desired preform shape and then quenched in water. The relatively soft workpiece is then machined to design, and as illustrated in FIG. 1, a band seat 10 is formed about the outer circumference of cylindrical body 12. A copper band 14 is cold pressed into seat 10 and an additional cylindrical plate 16 of titanium, not necessarily of the same alloy, is welded over body 12 at points 18 and 20 to form a hermetically sealed space 22. As shown, plate 16 contacts band 14 over its entire surface and completely about its circumference.

Figure 2:
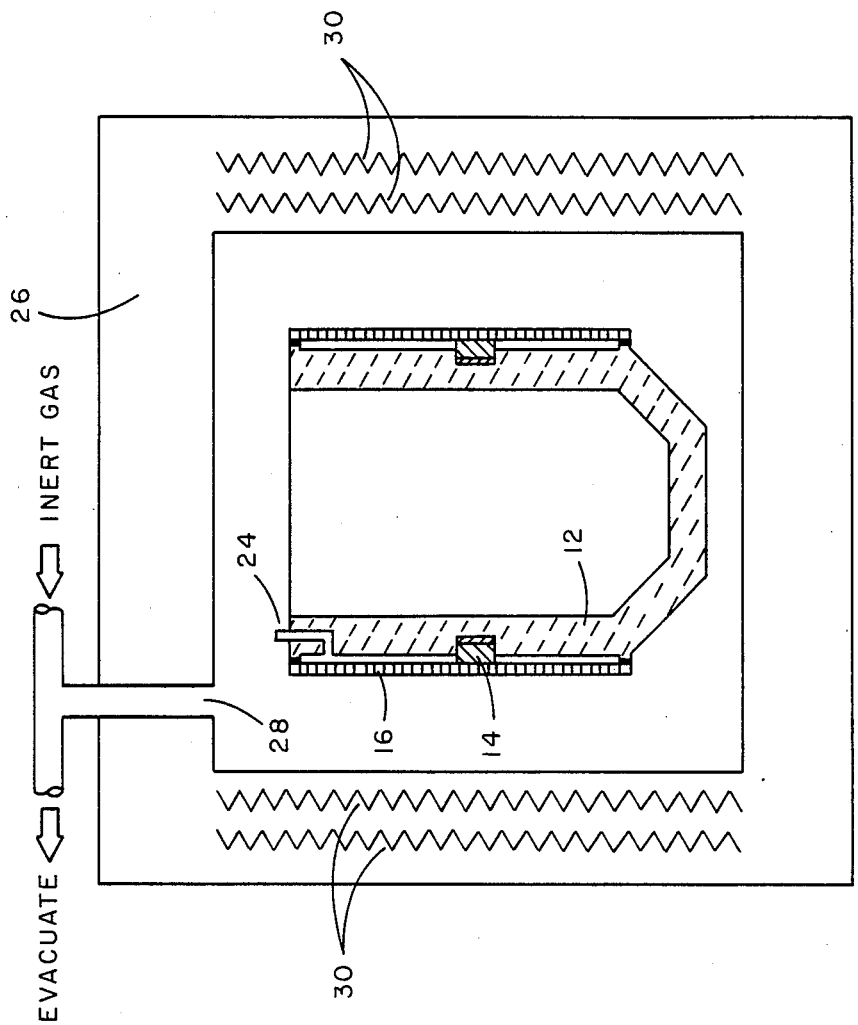
FIG. 2 is a cross-sectional schematic drawing of an apparatus employed in one step of the process.

Port 24 in body 12 provides the means to evacuate space 22 forming a vacuum therein which will facilitate the compression of band 14 against body 12 in seat 10 when the entire assembly is placed in an autoclave chamber 26 as shown in FIG. 2

After space 22 is evacuated and sealed, the projectile is placed in chamber 26 which is then evacuated after which an inert gas is introduced through port 28 at, for example, a pressure of 15,000 lbs./sq. in. Electrical resistance heaters 30 are employed to provide sufficient heat to create the bond in combination with the applied pressure. The temperature selected depends upon what process of conditioning is to be followed, and whether or not the use of an additional interfoil is added to the process.

It has been discovered that the inclusion of an interfoil of niobium metal 32 between band 14 and body 12 greatly enhances the strength of the bond. In such a case, the chamber is raised to a temperature of 1,600 degrees fahrenheit for a dwell time of one hour, and the assembly and chamber air cooled to ambient. Plate 16 is then machined off and the finished projectile with the band attached reheated to 1,600–1,650 degrees fahrenheit, quenched in water, and age hardened at 1,200 degrees fahrenheit for a period of one hour to attain final mechanical properties.

A bond of lesser but nevertheless substantial strength may be obtained without the use of the niobium interfoil by heating the chamber and assembly to 1,200 degrees fahrenheit for a dwell time of one hour after which the chamber and assembly are air cooled, and plate 16 is machined off. The final mechanical characteristics are attained simultaneously with the above step so in this case there is no further requirement for additional conditioning.

The above processing which conditions the titanium alloy, is designed to attain a level of mechanical integrity for the projectile body as described by the following mechanical property criteria: 165 KSI tensile yield strength at 0.1% strain; 175 KSI tensile ultimate strength; 10% tensile ultimate strain; 10 foot pounds V-notch Charpy impact resistance at minus 40 degrees fahrenheit. Determinations were made by conventional destructive tensile test and impact test of samples extracted from experimental projectile bodies. The bodies were sectioned, the test sample configurations machined, and conventional laboratory tests performed. A statistical base of the order of 100 test data points for each of the above named mechanical properties was ultimately provided.

With respect to the mechanical integrity of the diffusion bond, there was no pre-established criterion to evaluate such, since prior to this invention, this diffusion bonding is not known to have been accomplished. Therefore, as a means to monitor the conduct of the development of the diffusion bonding process herein, shear strength determinations were conducted as follows. Discs of the order of ½ inch diameter were trepanned from the banded area of the experimental projectile bodies. Cu-Ti couples of this kind were destructively sheared at the interface, employing improvised laboratory test equipment. Here, the titanium portion was held anchored, which the copper portion was loaded unidirectionally downward, thus being sheared purely in a single direction. Because of the circumferential geometry of the body, the above disc was necessarily of the small size of ½ inch, in order to approximate planar geometry for the test interface, and thus to simplify the test process. On the basis of approximately 10 test data points for samples with and without niobium interlayer, the respective shear strengths on the average were approximately 30 KSI and 28 KSI.

Substantial testing was also conducted to determine launch survival, particularly focusing on the differences in behavior between projectiles with and without niobium. Here, the diffusion bond for the niobium containing samples proved to be sufficiently robust for the purpose, whereas the other was not. It should be appreciated that the stresses carried here are much more severe and complex than the above laboratory shear test. For example, the stress rates are orders of magnitude greater, the shear directions are multi-directional, and tensile stresses are superimposed, particularly when balloting (rocking in the axial and transverse directions of the gun tube) is experienced when the gun tube wears.

What is claimed is:

1. A method of diffusion bonding copper and titanium alloy comprising the steps of:
    a. providing a copper workpiece and a titanium alloy workpiece to be joined;
    b. forming a mating surface between said workpieces;
    c. juxtaposing said workpieces at said surface;
    d. providing an additional plate of titanium and welding said plate over said copper workpiece and said alloy workpiece to create an assembly having a sealed space between said plate and said alloy workpiece, said plate being in contact with said copper workpiece;
    e. evacuating and sealing said space;
    f. providing an antoclave chamber and placing said assembly in said chamber;
    g. pressurizing said chamber at a selected pressure with an inert gas;
    h. heating said chamber at a selected temperature for a selected dwell time;
    i. air cooling said chamber;
    j. removing said assembly from said chamber and removing said plate from said assembly.

2. The method of claim 1 wherein said alloy comprises Ti-6Al-6V-2Sn.

3. The method of claim 2 further including the step of including a foil of niobium between said copper and said alloy.

4. The method of claim 3 wherein said selected pressure is 15,000 lbs./sq. in., said temperature is 1,600 degrees fahrenheit, and said dwell time is one hour.

5. The method of manufacturing a ballistic projectile comprising in combination the steps of:
    a. providing a quantity of titanium alloy;
    b. heating said alloy to a temperature of approximately 1,625 degrees fahrenheit;
    c. forging said alloy at said temperature to a selected preform configuration;
    d. quenching said preform in water;
    e. machining said preform to a selected projectile body configuration including the formation of a band seat about the outer circumference of said body;
    f. inserting a foil of niobium on the inside diameter of a band of copper;
    g. cold pressing said band of copper into said seat;
    h. providing an additional plate of titanium and welding said plate over said band and said body to create a sealed space between said plate and said body, said plate being in contact with the outer surface of said band;
    i. evacuating and sealing said space;
    j. providing an autoclave chamber and placing said projectile in said chamber;
    k. evacuating said chamber;
    l. pressurizing said chamber at 15,000 lbs./sq. in. with an inert gas;
    m. heating said chamber to 1,600 degrees fahrenheit for a period of approximately one hour;
    n. air cooling said chamber and said projectile;
    o. removing said projectile from said chamber and machining said plate from said body;
    p. heating said projectile to approximately 1,625 degrees fahrenheit;
    q. quenching said projectile in water; and
    r. age hardening said projectile at 1,200 degrees fahrenheit for one hour.

6. The method of claim 5 wherein said titanium alloy comprises Ti-6Al-6V-2Sn.

* * * * *